Figure 1:
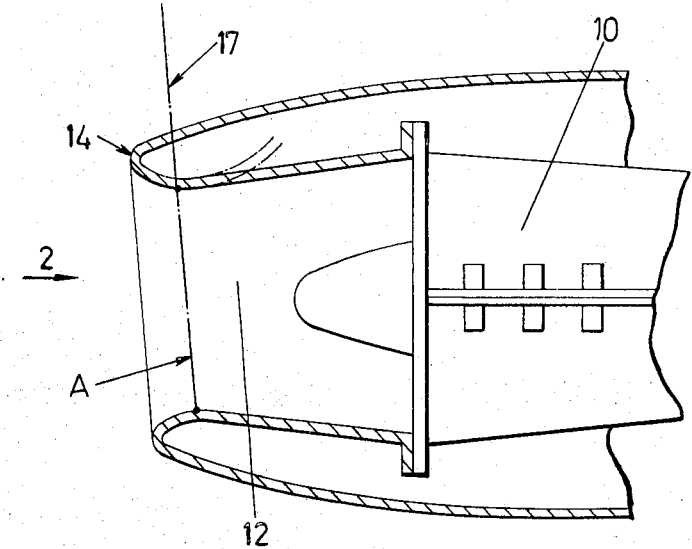

United States Patent [19]
Wilde et al.

[11] 3,763,874
[45] Oct. 9, 1973

[54] AIR INTAKE FOR A GAS TURBINE ENGINE

[75] Inventors: Geoffrey Light Wilde, Turnditch;
Leonard John Rodgers, Spondon,
both of England

[73] Assignee: Rolls-Royce (1911) Limited,
London, England

[22] Filed: Dec. 4, 1972

[21] Appl. No.: 311,958

[30] Foreign Application Priority Data
Dec. 4, 1971  Great Britain ................... 56,394/71

[52] U.S. Cl. .............................. 137/15.1, 244/53 B
[51] Int. Cl. ............................................. F02c 7/04
[58] Field of Search ......................... 137/15.1, 15.2; 244/53 B

[56] References Cited
UNITED STATES PATENTS
2,948,111  8/1960  Nelson ........................ 137/15.1 UX
FOREIGN PATENTS OR APPLICATIONS
1,243,280  8/1971  Great Britain ..................... 137/15.1

*Primary Examiner*—Alan Cohan
*Attorney*—John W. Malley et al.

[57] ABSTRACT

The air intake lip of a gas turbine engine is made movable so as to make possible an increase in its contraction ratio. The movement is achieved in a manner which maintains the air intake throat area and position substantially constant, thus avoiding changes in air flow characteristics between the throat plane and compressor face.

4 Claims, 6 Drawing Figures

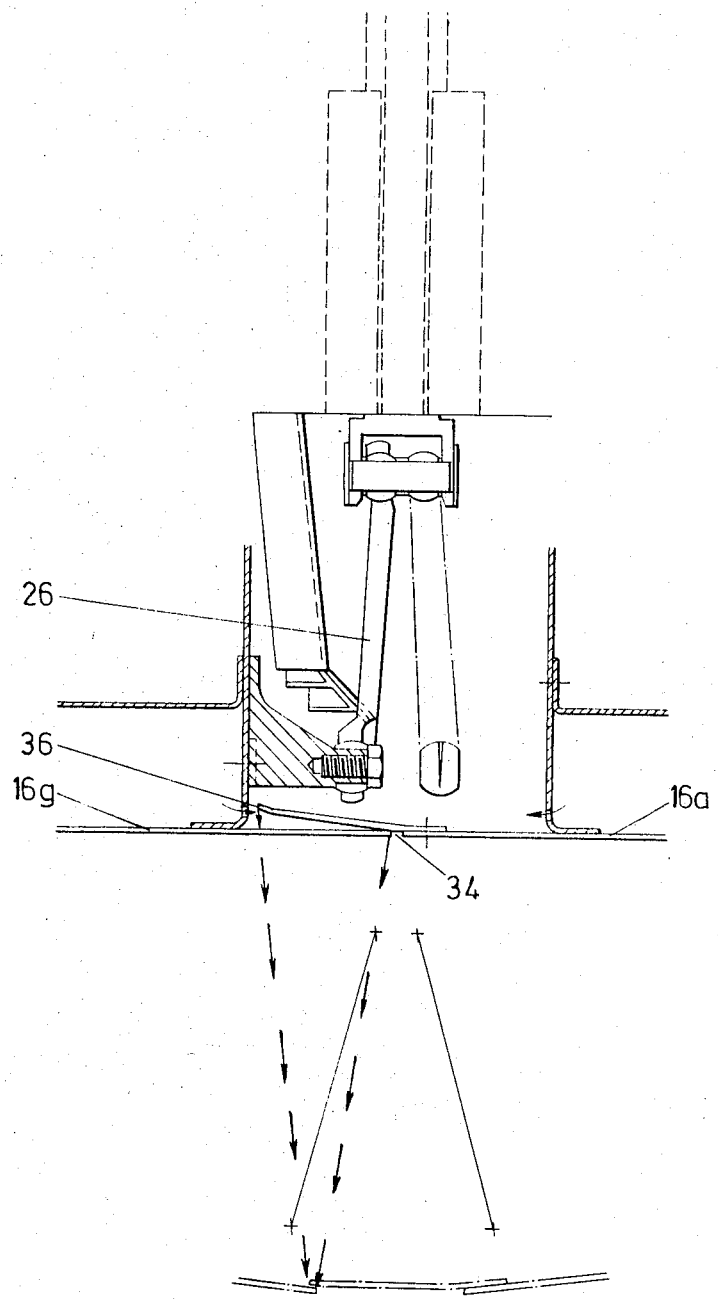

AIR INTAKE FOR A GAS TURBINE ENGINE

This invention concerns air intakes for gas turbine engines including those engines having ducted fans.

Aerodynamic considerations demand that the pod which encloses a gas turbine engine mounted on an aircraft should have as small an outside diameter as possible so as to maintain frontal area and therefore drag, at a minimum. Moreover, in order to ensure efficient working of the upstream or first stage fan and/or compressor blades of the engine, the air flow through the air intake must be distributed evenly over the fan or compressor face. Under normal conditions where aircraft and thus engine, flight path, are parallel with ambient air currents, this even distribution is achieved. However, in cross-wind conditions, that is where ambient air currents are not parallel with flight direction, even distribution within the air intake is lost by virtue of intake air travelling across the edge of the intake on one side thereof, breaking away and striking fully on the intake wall on the opposite side thereto, thus creating a low pressure area on the upwing side of the air intake.

One way to substantially obviate the low pressure effect in cross-winds, is to form a large radius of curvature on the air intake lip so as to encourage intake air to adhere thereto and travel round the lip into the intake proper and this could be done by making the intakes of thick section. But if the pod outside diameter was increased to provide the necessary thickness this would be contrary to the requirement that the pod should be of minimum diameter. Moreover, if the air intake pod structure was thickened by way of maintaining intake pod outer diameter but reducing intake inner diameter, this would reduce the diameter of the intake throat with detrimental affect on air flow volume to the compressor or fan face.

Thus it is an object of this invention to provide an air intake with a lip construction which permits changing the effective radius of curvature of the lip without first thickening the air intake pod and further avoiding reducing the air intake throat diameter.

Accordingly the present invention provides a gas turbine engine air intake pod including an upstream lip comprised of a plurality of U-section panel members arranged circumferentially of the pod, ecah panel member being roller mounted on respective curved tracks fixed to the pod so as to be rollable from a position wherein they form a first bell mouth for air flowing into the air intake of the air intake pod, to a further position therein they form a second, larger bell mouth for said air flow and back again as desired, but wherein the minimum diameter of the first bell mouth is at least not decreased as a result of either of said movements.

Preferably the minimum diameter of the first bell mouth defines the throat of the air intake of the air intake pod.

Means are provided whereby said movements of the U-section panel members is brought about.

Said means comprises air motor actuated ball screw and nut mechanisms or the like.

Each curved track is curved about a respective single radius of arc radiating from a point externally of the U-section panel.

Figure 2:
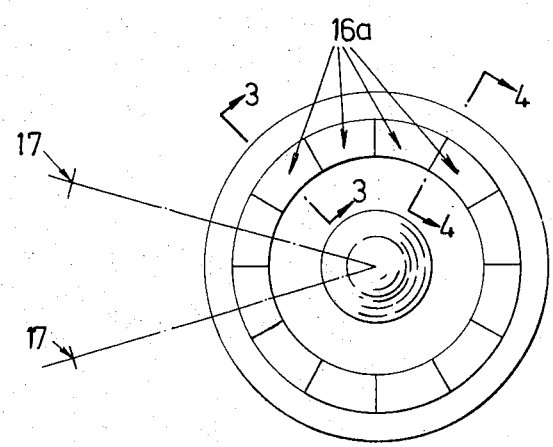
Figure 3:
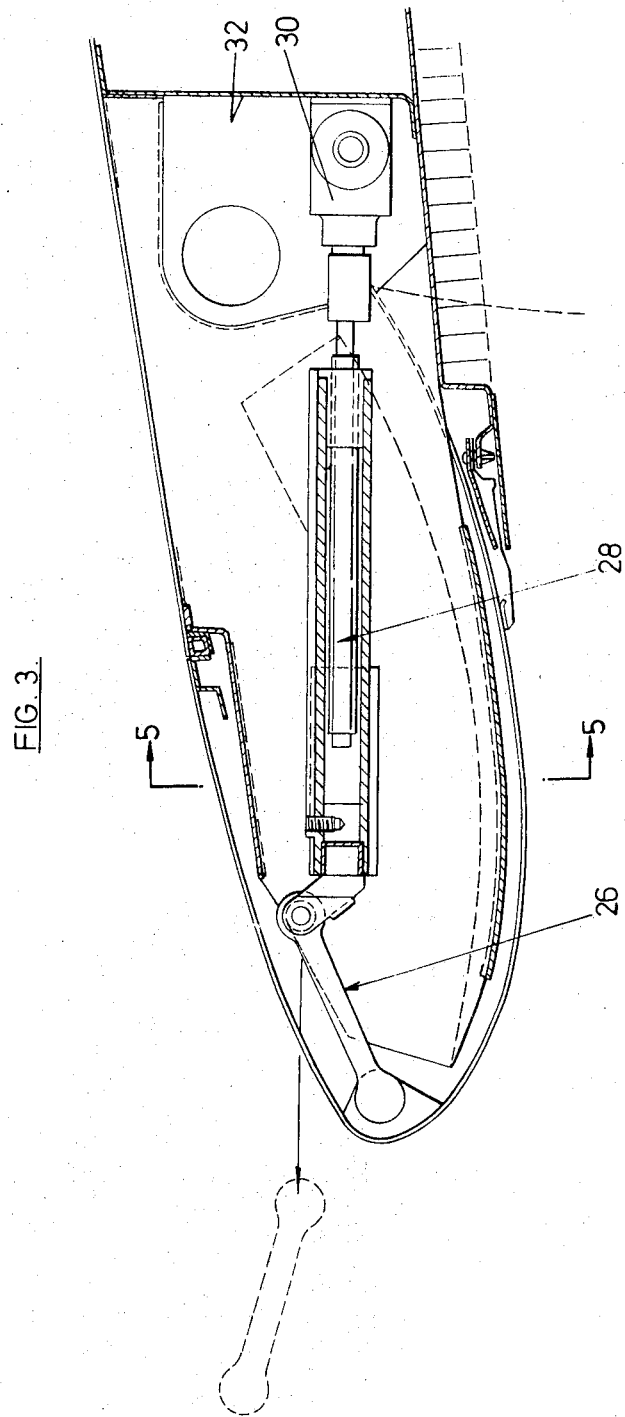
Figure 4:
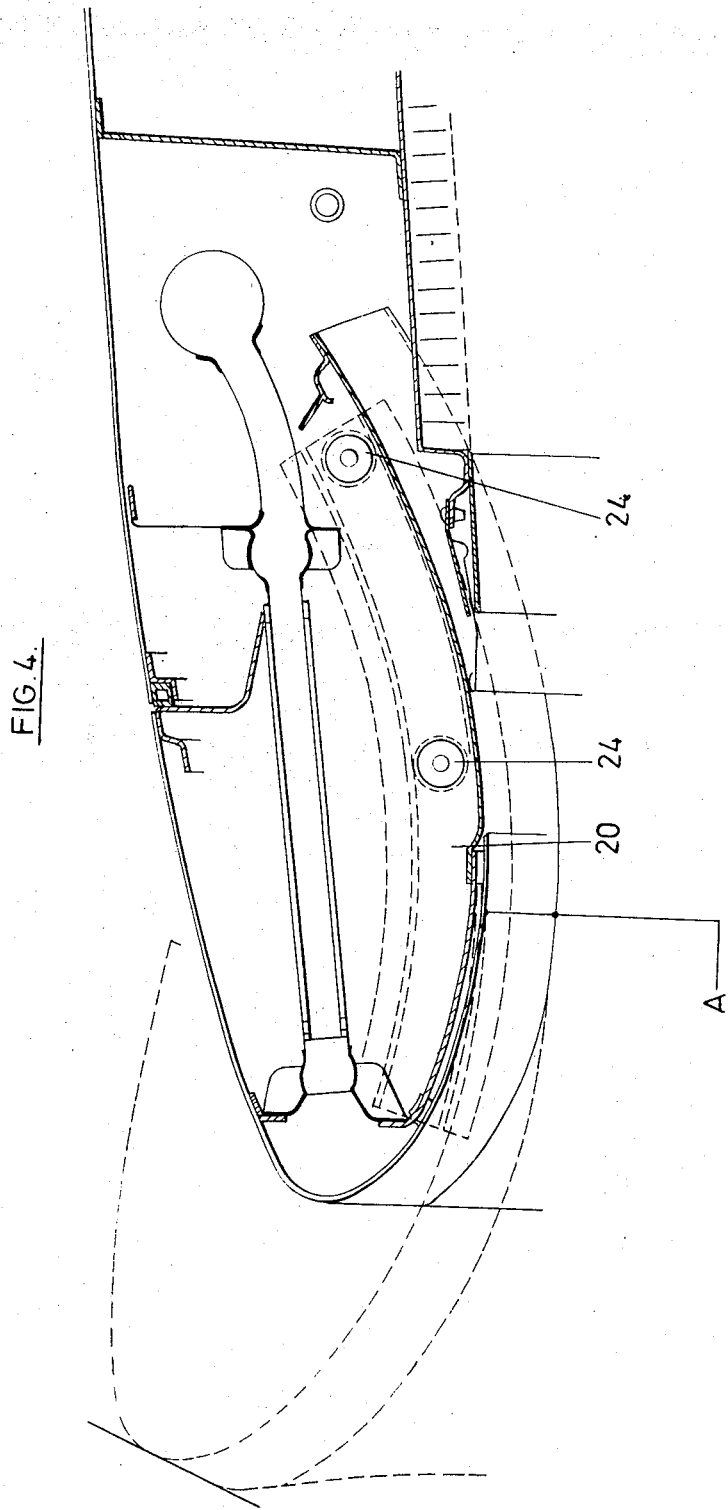
Figure 5:
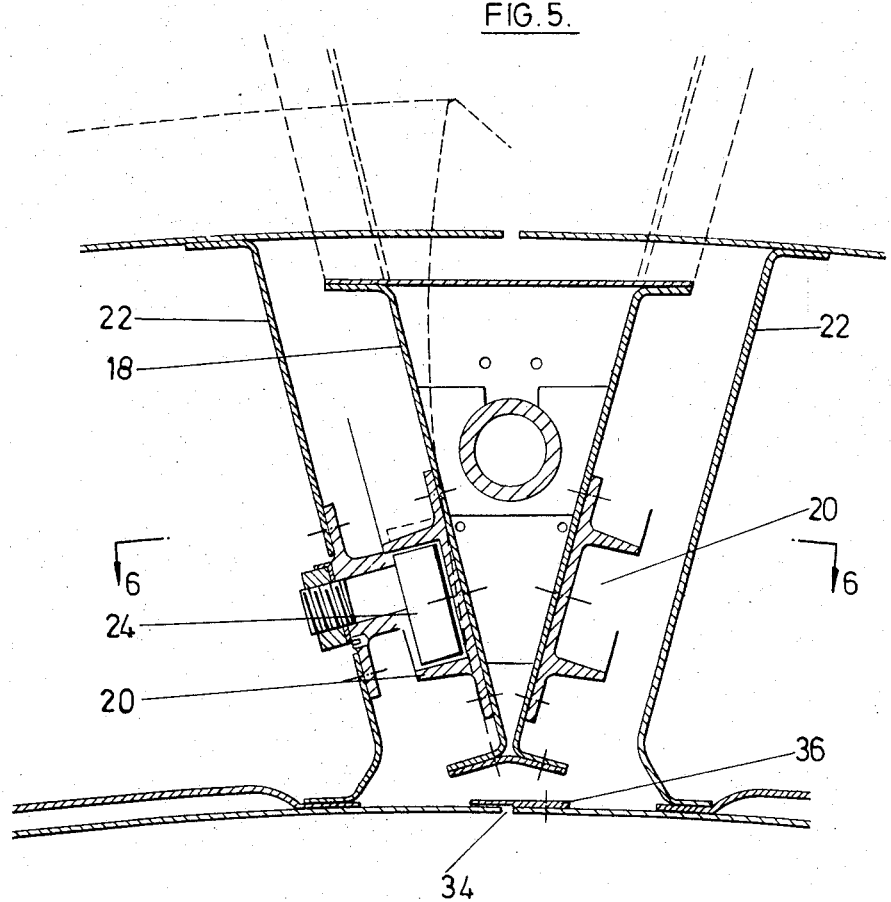

The invention will now be described with reference to the accompanying drawings in which:

FIG. 1 is a diagrammatic view of the air intake of a gas turbine engine,
FIG. 2 is a view on arrow 2 in FIG. 1,
FIG. 3 is a view on line 3—3 of FIG. 2,
FIG. 4 is a view on line 4—4 of FIG. 2,
FIG. 5 is a view on line 5—5 of FIG. 3, and
FIG. 6 is a view on line 6 of FIG. 5.

In FIG. 1 a gas turbine engine of which only the compressor 10 is shown, has a bell mouth air intake 12 formed by a streamlined casing 14. Intake 12 has a minimum diameter on a plane indicated by line A, which diameter defines the throat of the intake.

The throat diameter is critical in so far as it affects the airflow into the compressor 10 of the engine and is designed to give optimum performance so as to achieve efficient operation of the engine during some specific period thereof. In the present example, the engine, in operation, would drive an aircraft and the throat diameter of the air intake is designed to give optimum performance during take-off of the aircraft, which condition demands large quantities of air relative to the quantities of air required during cruise.

However, during movement of the aircraft on the ground, cross-winds may develop which flow at an acute angle to the plane of the throat rather than normal to it and this phenomena creates areas of low pressure on the upwind side of the intake by virtue of intake air on that side breaking away from the intake lip and flowing towards the centre thereof, rather than sweeping round the bell mouth portion and along the intake wall.

This cross-wind condition is also produced artificially when the aircraft nose is lifted on take-off, at least during that period in which the aircraft, although at an angle to the ground, is still flying parallel to it. The engines are also at an angle to the ground, thus the cross-wind effect is produced on the lowest portion of the intake lip.

In order to combat the cross-wind effect, the bell mouth lip 16 of the air intake is made movable so as to increase the bell mouth, or contraction ratio of the intake, the latter term being the one used in this context by those skilled in the art.

Lip 16 is made up of a number of U-section portions 16a spaced peripherally of casing 14 at its upstream end (FIG. 2) and having inner surfaces co-operating to form the bell mouth shape. The bell mouth shape itself on each U-section portion comprises a single radius of arc struck about a respective point 17 lying externally of casing 14 on the plane of the throat A of the air intake 12 and having a small radius of arc at its extreme upstream end.

Each portion 6a is separated from its adjacent portion by a triangular section rib 18 (FIG. 5) fixed to casing 14 and on each side of which is a curved channel 20.

Each portion 16a has side walls 22, each of which carries two rollers 24, one behind the other, which are located in channels 20, the arrangement being that each U-section portion 16a is located by means of its rollers 24, between the opposing side faces of adjacent ribs 18.

Each section portion 16a is connected via a link 26, to a ball screw 28 which in turn is connected for actuation to an air motor 30 or the like, which is supported on a bulkhead 32 in casing 14 (FIG. 3).

The arrangement of U-section portions 16a as described leaves a gap 34 between each adjacent pair thereof and this gap increases in magnitude as, in operation, the bell mouth is increased. Thus a fillet piece 36 is fastened by welding or the like to one side of one U-section portion 16a and overlaps the next adjacent portion 16a in sliding engagement. The fillet piece is of tapering shape so as to cover the tapering gap.

In operation, for example when an aircraft powered by an engine or engines having air intakes as described herein is taking off, ball screws 28 will be actuated so as to move forwardly, or to the left as viewed in FIG. 3. The ball screws will thus push, via links 26, on their respective U-section lip portions 16a which will then be caused to move, not only forwardly but also outwardly by virtue of their rollers being guided by curved tracks 20. The curvature of each track 20 comprises a single radius of arc struck about a respective point 17. Thus the U-section portions take up a position as indicated in dotted lines in FIG. 4. In this position, portions of the bell mouth which are more forward than the remainder thereof because of the attitude of the air intake relative to the direction of flight of the aircraft, are now substantially nearer to being parallel to the direction of flow of the cross-wind, the result being that the cross-wind flow, rather than breaking away from that bell mouth portion, adheres thereto and passes into the intake proper without creating low pressure areas adjacent the intake wall.

In any condition where cross-winds effects, whether the cross-wind be real or artificial, are felt, the air intake bell mouth can be manipulated to reduce that effect. Moreover, because that part of each U-section portion which forms the bell mouth is curved in the manner described hereinbefore, the air intake throat diameter is not altered. Thus air passing through the throat is not acted upon in any undesirable manner. It will be further appreciated that the ability to enlarge the bell mouth of the intake will enable better air flow distribution to be obtained at the compressor or fan face, when the engine is being ground run and ambient air is being sucked into the air intake from spaces at the side of the intake lip, which means of course that the ambient air has to flow through an angle of 90° in order to enter the air intake proper.

Those skilled in the art will readily appreciate that an air intake structure of the kind described and claimed herein, can readily be adapted to fit the upstream end of the fan cowl of a ducted fan gas turbine engine, the adaptation chiefly comprising dimensioned changes.

We claim:

1. A gas turbine engine air intake structure including an upstream lip comprised of a plurality of U-section panel members arranged circumferentially of the structure, each panel member being roller mounted on respective curved tracks fixed to the structure so as to be rollable from a position wherein they form a first bell mouth for air flowing into the air intake of the air intake structure, to a further position wherein they form a second, larger bell mouth for said air flow and back again as desired, but wherein the minimum diameter of the first bell mouth is at least not decreased as a result of either of said movements.

2. A gas turbine engine air intake structure as claimed in claim 1 wherein the minimum diameter of the first bell mouth comprises the throat of the air intake of the air intake pod.

3. A gas turbine engine air intake structure as claimed in claim 2 wherein the curve of said curved tracks lies on a constant radius of arc struck about a centre which lies externally of the structure and in the plane of the air intake throat.

4. A gas turbine engine air intake structure as claimed in claim 1 wherein alternate U-section panels each include a sealing strip which is fixed to one side thereof and is sufficiently wide to overlap a respective U-section panel in either the first or second position so as to prevent ingress of air between adjacent panels.

* * * * *

UNITED STATES PATENT OFFICE
CERTIFICATE OF CORRECTION

Patent No. 3,763,874          Dated October 9, 1973

Inventor(s) Geoffrey Light Wilde and Leonard John Redgers

It is certified that error appears in the above-identified patent and that said Letters Patent are hereby corrected as shown below:

Please correct front page format as follows:

In paragraph [73] Assignee: "Rolls-Royce (1911) Limited,"

should read [73] Assignee: --Rolls-Royce (1971) Limited,--

Signed and sealed this 1st day of January 1974.

(SEAL)
Attest:

EDWARD M. FLETCHER, JR.　　　　RENE D. TEGTMEYER
Attesting Officer　　　　　　　　Acting Commissioner of Patents